United States Patent [19]

McCoige

[11] 4,088,857
[45] May 9, 1978

[54] BACK-UP ALARM HAVING A MODULAR CONSTRUCTION

[75] Inventor: Bruce K. McCoige, Pekin, Ill.

[73] Assignee: Caterpillar Tractor Co., Peoria, Ill.

[21] Appl. No.: 682,241

[22] Filed: May 3, 1976

[51] Int. Cl.² .............................................. H01H 9/06
[52] U.S. Cl. ................................................. 200/61.88
[58] Field of Search ............... 200/61.28, 61.88, 61.91; 340/71, 70

[56] References Cited

U.S. PATENT DOCUMENTS

| | | | |
|---|---|---|---|
| 1,212,836 | 1/1917 | Stewart | 200/61.88 |
| 1,941,089 | 12/1933 | Hellman | 200/61.88 X |
| 2,829,213 | 4/1958 | Brett | 200/61.88 |
| 3,439,324 | 4/1969 | Kirimoto et al. | 340/70 |
| 3,748,417 | 7/1973 | Morino et al. | 200/61.88 X |
| 3,811,020 | 5/1974 | Johnson et al. | 200/61.88 |
| 3,827,024 | 7/1974 | Anderson et al. | 340/70 |

Primary Examiner—James R. Scott
Attorney, Agent, or Firm—Wegner, Stellman, McCord, Wiles & Wood

[57] ABSTRACT

A control for controlling a signal device in a vehicle for signalling an intended reverse operation of the vehicle. The control defines a unitary device removably installed in the gearshift console of the vehicle so as to be actuated by movement of a portion of the gearshift lever disposed within the console. The console housing may be provided with an opening through which the control is installed and the control may include a mounting plate removably secured to the housing at the edge of the opening with the mounting plate extending effectively across the opening. The control includes a switch and a switch operator disposed in the path of movement of the gearshift lever portion within the console housing.

8 Claims, 3 Drawing Figures

BACK-UP ALARM HAVING A MODULAR CONSTRUCTION

BACKGROUND OF THE INVENTION

1. Field of the Invention

This invention relates to controls for signalling an intended back-up of a reversible vehicle prior to the initiation of the back-up motion.

2. Description of the Prior Art

One conventional method of signalling the back-up of a vehicle, such as a truck or the like, is to provide a signal-operating switch engageable by the gearshift levers of the truck when they are shifted to a reverse drive position. An illustrative form of such a back-up safety signal is shown in U.S. Pat. No. 2,829,213 of William J. Brett. Brett teaches the provision of the signal control in the transmission housing comprising switch operating means for operating a switch carried by the housing for operation when the control is moved into the position in which the transmission is in reverse drive.

Seiji Kirimoto et al, in U.S. Pat. No. 3,439,324, show a back-up warning device for a vehicle which is actuated by a gearshifting linkage when the control is placed in reverse. In the Kirimoto et al patent, a switch is closed by the shifting of the gearshift lever to the reverse position.

Another form of motion alarm for vehicles is illustrated in U.S. Pat. No. 3,827,024 of Arlynn W. Anderson et al, which patent is owned by the assignee hereof. In the Anderson et al patent, a motion alarm is provided which is actuated by elements of the vehicle drive system which not only operates the audible alarm when the vehicle is deliberately backed up, but also operates the alarm as a result of unexpected motion occurring in either direction as when the vehicle has been parked and is unattended. A logic circuit is provided to prevent operation of the alarm when forward motion of the vehicle is deliberately intended. When the shifting lever is shifted to the reverse position, a magnet is caused to close a reed switch to initiate sounding of the audible signal. In addition, the control activates the signal device by other operating conditions of the vehicle.

An improved apparatus for signalling an intended reverse operation of a vehicle, or similar mechanism, having a shift lever selectively positionable in forward, neutral, and reverse positions prior to placement of the shift lever in the reverse position for effecting reverse operation, is disclosed in the application of Michael B. Hyde et al. Ser. No. 682,423, now U.S. Pat. No. 4,603,217 filed concurrently herewith, entitled Back-up Alarm Activation Mechanism For Power Shift Tractors, which application is owned by the assignee hereof. The apparatus disclosed therein includes an activating structure responsive to movement of the shift lever in the neutral position toward the reverse position for activating the control of a signalling device prior to reverse operation of the mechanism. The control includes a switch actuator mounted to a carrier which is pivotally mounted to the console housing and a switch which is similarly mounted to the housing internally thereof.

SUMMARY OF THE INVENTION

The present invention comprehends an improved vehicle gearshift console control for signalling such an intended reverse operation of a vehicle, or similar mechanism, which is adapted to be installed as a unit in the console through a suitable opening provided in the console housing.

The unit is adapted to be removably secured to the console housing by suitable securing means, such as threaded securing means.

The control may include a mounting plate adapted to be secured across the opening of the housing by the removable securing means and carrying the control elements for selective operation by the gearshift lever to effect the desired control of the signalling device.

The unitary construction of the control permits its ready installation into existing vehicle consoles to provide the highly desirable improved back-up warning signalling.

Thus, the control means of the present invention is extremely simple and economical of construction while yet providing the highly desirable features discussed above.

BRIEF DESCRIPTION OF THE DRAWING

Other features and advantages of the inventions will be apparent from the following description taken in connection with the accompanying drawing wherein.

DESCRIPTION OF THE PREFERRED EMBODIMENT

Figure 1:
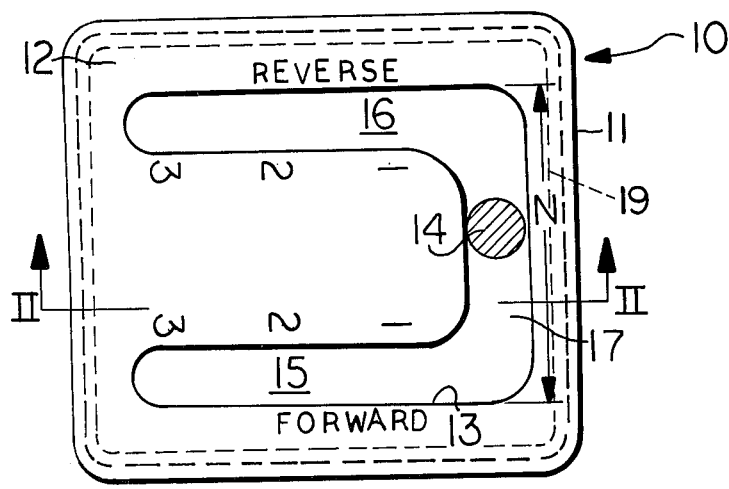
FIG. 1 is a top plan view of a vehicle gearshift console provided with a back-up warning control embodying the invention.

In the exemplary embodiment of the invention as disclosed in the drawing, a vehicle gearshift console generally designated 10 is provided with a housing 11 having a top wall 12 defining a U-shaped slot 13 for guiding a gearshift lever 14.

As shown in FIG. 1, the slot 13 is U-shaped defining a first leg 15, an opposite leg 16, and a bight 17. Gearshift lever 14 is selectively moved to leg 15 to effect a forward operation of the vehicle and to leg 16 to effect a reverse operation of the vehicle. When the gearshift lever 14 is in the bight portion 17 of the slot, the gearshift mechanism is in neutral.

The present invention is concerned with the provision of a warning signal when the user of the vehicle intends to place the vehicle in reverse operation. The invention comprehends the provision of a control generally designated 18 for actuating a suitable signal device, such as a horn (not shown), when the gearshift lever is being moved in the neutral position toward the reverse position, while the gearshift lever is in the reverse position, and when the gearshift lever is being moved in the neutral position away from the reverse position. Thus, the control is intended to provide a warning signal prior to, during, and subsequent to an actual reverse operation of the vehicle.

The invention comprehends an improved form of such a control which is adapted to be installed as a unit in the housing 11 of the console so as to be adapted for ready installation in existing consoles as well as in new manufacture.

Figure 2:
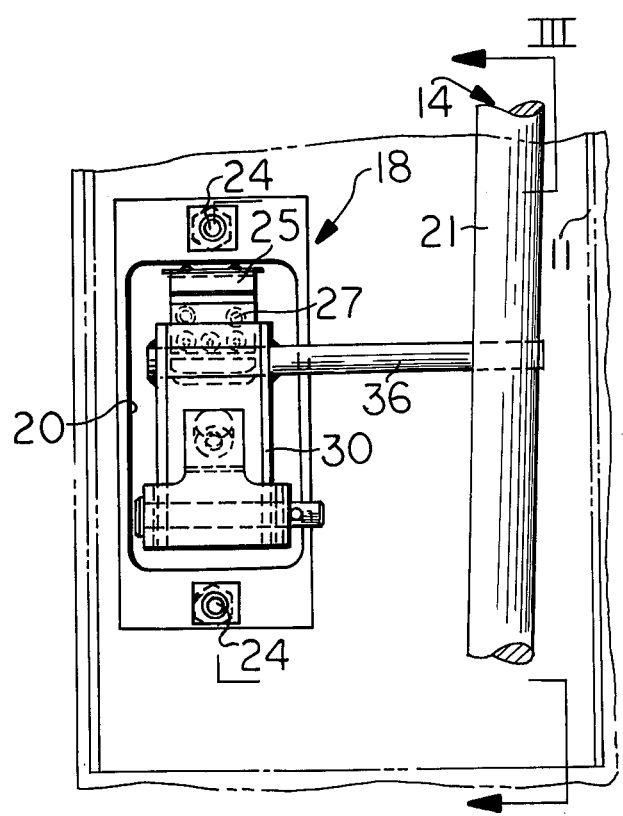
FIG. 2 is a vertical section thereof taken substantially along the line 2—2 of FIG. 1.
Figure 3:
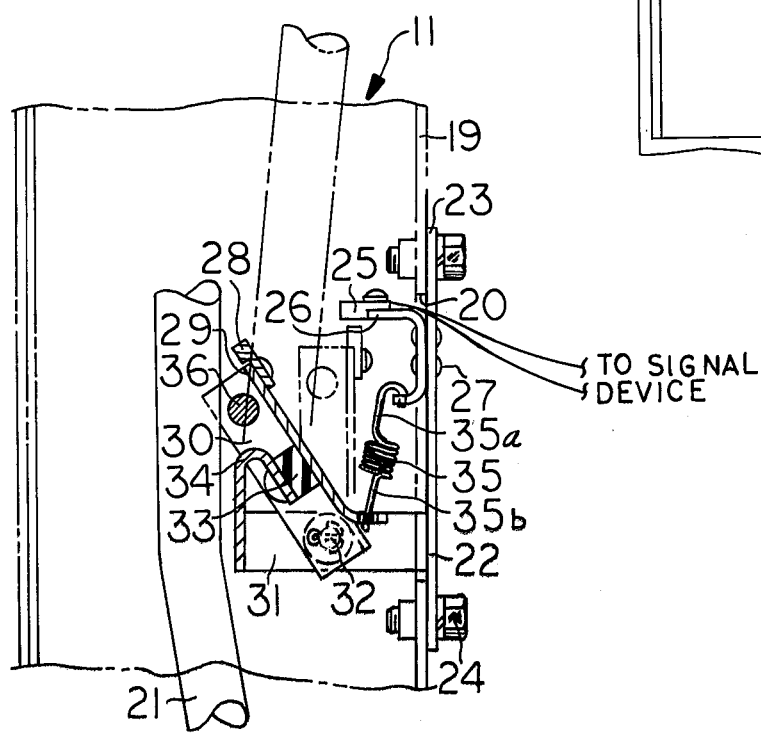
FIG. 3 is a vertical section taken substantially along the line 3—3 of FIG. 2.

More specificaly, referring to FIGS. 2 and 3, housing 11 may be provided with a side wall 19 having an opening 20 disposed adjacent the reverse position of the gearshift lever portion 21 within the housing 11. The control 18 is carried on a mounting plate 22 which is arranged to overlap the opening 20 and have edge portions 23 thereof removably secured to the housing side wall 19 by suitable removable securing means, such as threaded screws 24. The mounting plate may be arranged to extend fully across the opening 20 so as to effectively close the opening when control 18 is installed on the console housing.

Control 18 includes a reed switch 25 which is carried on a bracket 26 secured to the mounting plate 22 as by rivets 27.

A magnet 28 for selectively operating switch 25 is secured to the upper end 29 of the mounting arm 30. The lower end of the mounting arm is pivotably mounted to a bracket 31 by a pivot 32 for swinging movement between the full line, retracted position of FIG. 3 and the switch-actuating, broken line position.

Arm 30 may be provided with a resilient bumper 33 adapted to engage a fixed stop 34 carried at the distal end of the bracket 31. The arm is biased to the retracted position of FIG. 3 by a tension spring 35 having one end 35a connected to the bracket 26 and an opposite end 35b connected to arm 30.

As best seen in FIG. 2, a control member 36 comprising an elongated rod, is cantilevered from arm 30 so as to be disposed in the path of movement of the gearshift lever portion 21 when the gearshift lever is moved from the neutral position toward and in the reverse position defined by slot leg 16. Thus, as shown in FIG. 3, during such positioning of the gearshift lever portion 21, its engagement with the rod 36 causes a swinging of the arm 30 from the full line position to the broken line position of FIG. 3 against the biasing action of spring 35 so as to cause switch 25 to operate the associated signal device and thereby provide a warning of the intended back-up of the vehicle as well as maintaining warning during the actual reverse operation of the vehicle, and until the gearshift lever is returned again to the centered neutral position illustrated in FIG. 1.

As the control 18 is a unitary device which may be suitably disposed adjacent the gearshift lever portion 21 by the expedient of mounting the plate 22 across the console housing opening 20, an improved facilitated installation of the control in existing vehicle consoles is provided. Further, as the mounting of the control is readily removable, facilitated servicing thereof may be effected at any time. The control may be adjusted and serviced independently of the console for further facilitated maintenance of the apparatus.

The foregoing disclosure of specific embodiments is illustrative of the broad inventive concepts comprehended by the invention.

What is claimed is:

1. In a vehicle structure having a reverse operation signal device and gearshift console having a housing, a shift lever selectively positionable in forward, neutral, and reverse positions and having a portion within said housing, improved means for modifying the vehicle structure for controlling said signal device for signalling an intended reverse operation of the vehicle, comprising: means defining an opening in said housing adjacent said reverse position of the shift lever portion within said housing; a mounting plate; control means carried by the mounting plate as a unit for operating the signal device in response to movement of the shift lever in the neutral position adjacent the reverse position toward the reverse position, movement in said reverse position, and movement adjacent the reverse position in the neutral position away from the reverse position; and securing means for removably securing the mounting plate to the housing across said opening to mount the control means in said housing inwardly of said opening in accurate preselected relationship to said shift lever for actuation by said shift lever portion movements within the housing.

2. The vehicle gearshift structure of claim 1 wherein said plate extends fully across said opening to close the same.

3. The vehicle gearshift structure of claim 1 wherein said securing means includes bracket means on said mounting plate for carrying said control means.

4. The vehicle gearshift structure of claim 1 wherein said control means includes a switch, a pivotally mounted switch actuator, and a control member cantilevered from said switch actuator to be engaged by said shift lever portion to effect operation of said switch by said actuator.

5. The vehicle gearshift structure of claim 1 wherein said control means includes a switch, a switch actuator, means pivotally mounting said actuator to said mounting plate, and a control member cantilevered from said means pivotally mounting said actuator to be engaged by said shift lever portion to effect operation of said switch by said actuator.

6. The vehicle gearshift structure of claim 5 wherein said control member comprises an elongated rod.

7. The vehicle gearshift structure of claim 1 wherein said securing means comprises readily removable threaded means.

8. The vehicle gearshift structure of claim 1 wherein said mounting plate includes a peripheral portion overlapping the housing substantially fully about said opening.